United States Patent
Chen

(10) Patent No.: US 9,760,456 B2
(45) Date of Patent: Sep. 12, 2017

(54) MEMORY MANAGEMENT METHOD, MEMORY STORAGE DEVICE AND MEMORY CONTROL CIRCUIT UNIT

(71) Applicant: PHISON ELECTRONICS CORP., Miaoli (TW)

(72) Inventor: Jiann-Mou Chen, Miaoli County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 183 days.

(21) Appl. No.: 14/818,316

(22) Filed: Aug. 5, 2015

(65) Prior Publication Data

US 2016/0350191 A1 Dec. 1, 2016

(30) Foreign Application Priority Data

May 26, 2015 (TW) .............................. 104116812 A

(51) Int. Cl.
  *G06F 11/20* (2006.01)
  *G06F 3/06* (2006.01)
(52) U.S. Cl.
  CPC .......... *G06F 11/2046* (2013.01); *G06F 3/064* (2013.01); *G06F 3/0616* (2013.01); *G06F 3/0644* (2013.01); *G06F 3/0679* (2013.01); *G06F 2201/85* (2013.01)
(58) Field of Classification Search
  CPC ................................................. G06F 11/2094
  USPC ....................................................... 714/6.32
  See application file for complete search history.

(56) References Cited

U.S. PATENT DOCUMENTS

| | | | | |
|---|---|---|---|---|
| 5,559,958 A * | 9/1996 | Farrand | ............... | G06F 11/0709 709/223 |
| 2003/0002366 A1* | 1/2003 | Mizoguchi | ............ | G06F 3/0619 365/201 |
| 2003/0043626 A1* | 3/2003 | Abe | ...................... | G11C 29/808 365/185.09 |
| 2007/0283428 A1* | 12/2007 | Ma | ...................... | G06F 11/1068 726/9 |
| 2008/0126678 A1* | 5/2008 | Mizushima | ......... | G06F 11/1068 711/103 |
| 2009/0046512 A1* | 2/2009 | Halloush | ................ | G11C 16/22 365/185.09 |
| 2011/0099320 A1* | 4/2011 | Lucas | ................... | G06F 3/0616 711/103 |
| 2012/0324150 A1* | 12/2012 | Moshayedi | ........... | G06F 3/0619 711/103 |
| 2014/0359347 A1* | 12/2014 | Fuxa | ................... | G06F 11/1096 714/6.22 |

(Continued)

FOREIGN PATENT DOCUMENTS

JP 07182793 A * 7/1995 ........... G11B 7/0037

*Primary Examiner* — Chae Ko
(74) *Attorney, Agent, or Firm* — Jianq Chyun IP Office

(57) ABSTRACT

A memory management method, a memory storage device and a memory control circuit unit are provided. The memory management method includes: detecting a replacement physical unit number of a rewritable non-volatile memory module; adjusting an available capacity of the rewritable non-volatile memory module from a first available capacity to a second available capacity if the replacement physical unit number meets a default condition. Therefore, a lifespan of the memory storage device may be prolonged by adjusting the available capacity of the rewritable non-volatile memory module.

24 Claims, 9 Drawing Sheets

(56) References Cited

U.S. PATENT DOCUMENTS

| | | | | |
|---|---|---|---|---|
| 2015/0178191 A1* | 6/2015 | Camp | ................. | G06F 12/0246 711/103 |
| 2015/0243370 A1* | 8/2015 | Zhang | .............. | G11C 29/56008 714/718 |
| 2016/0259594 A1* | 9/2016 | Takahashi | ............. | G06F 3/0619 |

\* cited by examiner

MEMORY MANAGEMENT METHOD, MEMORY STORAGE DEVICE AND MEMORY CONTROL CIRCUIT UNIT

CROSS-REFERENCE TO RELATED APPLICATION

This application claims the priority benefit of Taiwan application serial no. 104116812, filed on May 26, 2015. The entirety of the above-mentioned patent application is hereby incorporated by reference herein and made a part of this specification.

BACKGROUND

1. Technology Field

The present disclosure generally relates to a memory management method and in particular, to a memory management method, a memory storage device and a memory control circuit unit.

2. Description of Related Art

Along with the widespread of digital cameras, cellular phones, and MP3 players in recently years, the consumers' demand to storage media has increased drastically. Because a rewritable non-volatile memory module (e.g., a flash memory) has features such as data non-volatility, low power consumption, small volume, and non-mechanical structure, the rewritable non-volatile memory module is adaptive to be built in the aforementioned portable multi-media devices.

In general, after the rewritable non-volatile memory module has been used for a period of time, some physical blocks in the rewritable non-volatile memory module may be damaged. The damage may be caused due to hardware damage or an overly high error rate of the data stored in the physical blocks. A typical manner to deal with the damaged physical block is to replace the damaged physical blocks with some backup physical blocks. However, in case the damaged physical blocks are in a large number, which leads to insufficient backup physical blocks in the rewritable non-volatile memory module, the rewritable non-volatile memory module may be hard to be used any longer.

Nothing herein should be construed as an admission of knowledge in the prior art of any portion of the present disclosure. Furthermore, citation or identification of any document in this application is not an admission that such document is available as prior art to the present disclosure, or that any reference forms a part of the common general knowledge in the art.

SUMMARY

Accordingly, the present disclosure is directed to a memory management method, a memory storage device and a memory control circuit unit capable of prolonging a lifespan of the memory storage device by adjusting an available capacity of a rewritable non-volatile memory module.

According to an exemplary embodiment of the present disclosure, a memory management method for controlling a rewritable non-volatile memory module is provided. The memory management method includes: detecting a replacement physical unit number of the rewritable non-volatile memory module, wherein the replacement physical unit number is related to a number of at least one replacement physical unit in the rewritable non-volatile memory module, and each of the at least one replacement physical unit is configured to replace a bad physical unit in the rewritable non-volatile memory module; and adjusting an available capacity of the rewritable non-volatile memory module from a first available capacity to a second available capacity if the replacement physical unit number of the rewritable non-volatile memory module meets a default condition, wherein the available capacity is a total capacity of a plurality of available physical units in the rewritable non-volatile memory module, and each of the available physical units does not belong to the physical units.

According to another exemplary embodiment of the present disclosure, a memory storage device including a connection interface unit, a rewritable non-volatile memory module and a memory control circuit unit is provided. The connection interface unit is configured to couple to a host system. The memory control circuit unit is coupled to the connection interface unit and the rewritable non-volatile memory module. The memory control circuit unit is configured to detect a replacement physical unit number of the rewritable non-volatile memory module. The replacement physical unit number is related to a number of at least one replacement physical unit in the rewritable non-volatile memory module. Each of the at least one replacement physical unit is configured to replace a bad physical unit in the rewritable non-volatile memory module. If the replacement physical unit number of the rewritable non-volatile memory module meets a default condition, the memory control circuit unit is further configured to adjust the available capacity of the rewritable non-volatile memory module from a first available capacity to a second available capacity. The available capacity is a total capacity of a plurality of available physical units in the rewritable non-volatile memory module. Each of the available physical units does not belong to the replacement physical units.

According to yet another exemplary embodiment of the present disclosure, a memory control circuit unit for controlling a rewritable non-volatile memory module is provided. The memory control circuit unit includes a host interface, a memory interface and a memory management circuit. The host interface is configured to couple to a host system. The memory interface is configured to couple to the rewritable non-volatile memory module. The memory management circuit is coupled to the host interface and the memory interface. The memory management circuit is configured to detect a replacement physical unit number of the rewritable non-volatile memory module. The replacement physical unit number is related to a number of at least one replacement physical unit in the rewritable non-volatile memory module. Each of the at least one replacement physical unit is configured to replace a bad physical unit in the rewritable non-volatile memory module. If the replacement physical unit number of the rewritable non-volatile memory module meets a default condition, the memory management circuit is further configured to adjust the available capacity of the rewritable non-volatile memory module from a first available capacity to a second available capacity. The available capacity is a total capacity of a plurality of available physical units in the rewritable non-volatile memory module. Each of the available physical units does not belong to the replacement physical units.

To sum up, in the present disclosure, when the replacement physical unit number of the rewritable non-volatile memory module meeting a specific default condition is detected, the available capacity of the rewritable non-volatile memory module is adjusted. Thereby, the lifespan of the memory storage device can be prolonged.

In order to make the aforementioned and other features and advantages of the present disclosure more comprehensible, several embodiments accompanied with figures are described in detail below.

It should be understood, however, that this Summary may not contain all of the aspects and embodiments of the present disclosure, is not meant to be limiting or restrictive in any manner, and that the present disclosure as disclosed herein is and will be understood by those of ordinary skill in the art to encompass obvious improvements and modifications thereto.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure.

DESCRIPTION OF THE EMBODIMENTS

Figure 1:
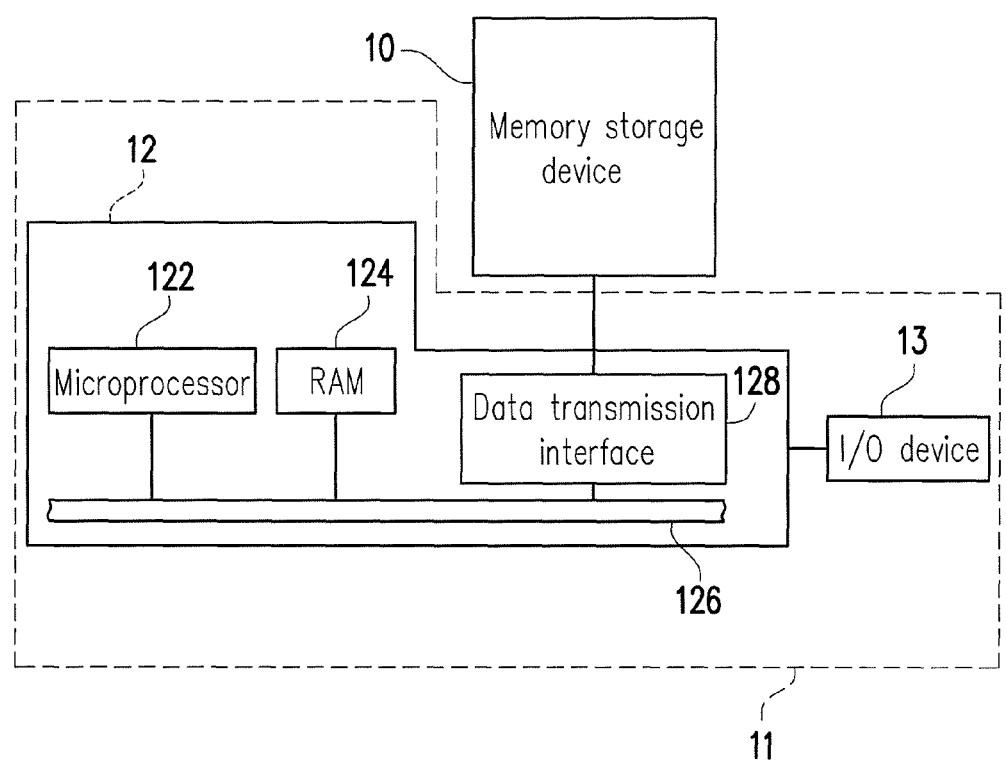
FIG. 1 is a schematic diagram illustrating a host system and a memory storage device according to an exemplary embodiment.

Reference will now be made in detail to the present embodiments of the present disclosure, examples of which are illustrated in the accompanying drawings. Wherever possible, the same reference numbers are used in the drawings and the description to refer to the same or like parts.

Embodiments of the present disclosure may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

A memory storage device (i.e., a memory storage system) typically includes a rewritable non-volatile memory module and a controller (i.e., a control circuit). The memory storage device is usually used together with a host system, such that the host system can write data into or read data from the memory storage device.

Figure 2:
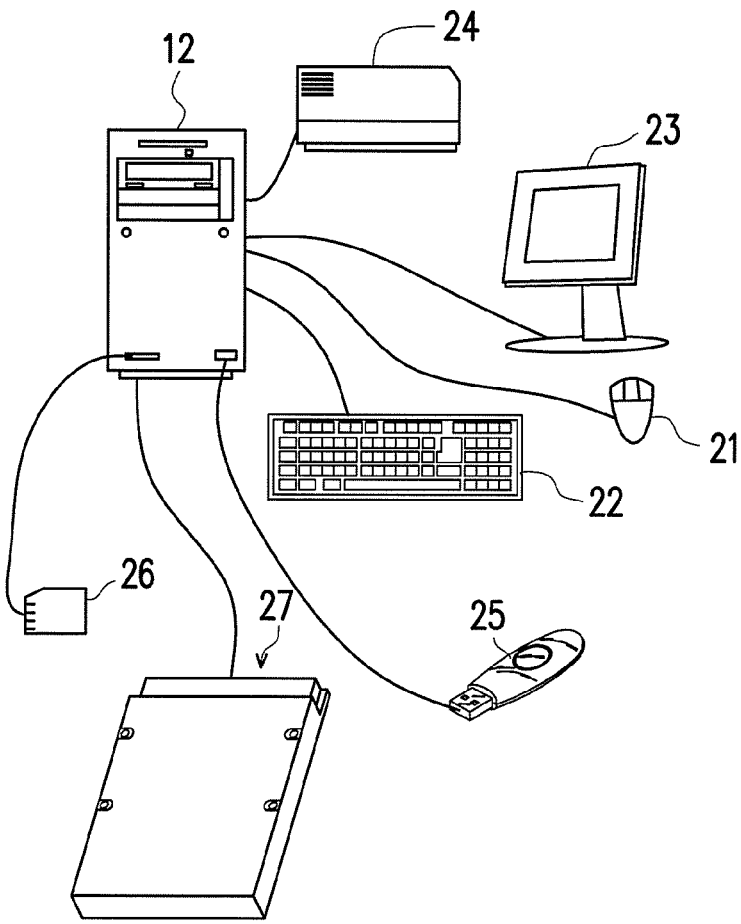
FIG. 2 is a schematic diagram illustrating a computer, an input/output (I/O) device, and a memory storage device according to an exemplary embodiment.

FIG. 1 is a schematic diagram illustrating a host system and a memory storage device according to an exemplary embodiment. FIG. 2 is a schematic diagram illustrating a computer, an input/output (I/O) device, and a memory storage device according to an exemplary embodiment.

With reference to FIG. 1, a host system 11 usually includes a computer 12 and an input/output (I/O) device 13. The computer 12 includes a microprocessor 122, a random access memory (RAM) 124, a system bus 126 and a data transmission interface 128. The I/O device 13 includes a mouse 21, a keyboard 22, a display 23, and a printer 24, as shown in FIG. 2. It should be understood that, the devices depicted in FIG. 2 should not be construed as limitations to the present disclosure, and the I/O device 13 may include other devices as well.

In an exemplary embodiment, the memory storage device 10 is coupled to other devices of the host system 11 through the data transmission interface 128. With the operations of the microprocessor 122, the RAM 124, and the I/O device 13, data can be written into or read from the memory storage device 10. For instance, the memory storage device 10 may be a rewritable non-volatile memory storage device, such as a flash drive 25, a memory card 26, or a solid state drive (SSD) 27 as shown in FIG. 2.

Figure 3:
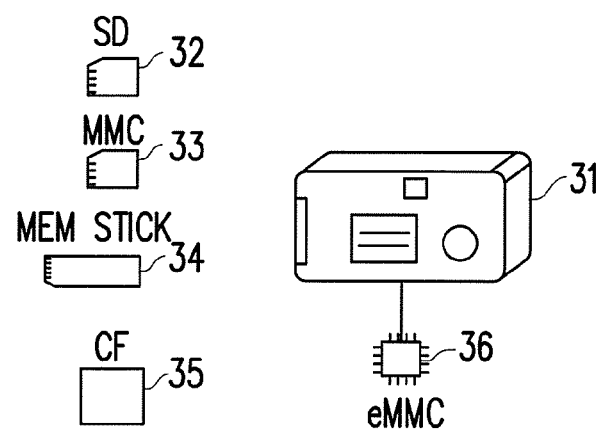
FIG. 3 is a schematic diagram illustrating the host system and the memory storage device according to an exemplary embodiment.

FIG. 3 is a schematic diagram illustrating the host system and the memory storage device according to an exemplary embodiment.

Generally, the host system 11 can substantially be any system used together with the memory storage device 10 for storing data. Even though the host system 11 is described as a computer system in the present exemplary embodiment, the host system 11 in another exemplary embodiment may be a digital camera, a video camera, a communication device, an audio player, a video player, and so on. For instance, if the host system is a digital camera (video camera) 31, the rewritable non-volatile memory storage device is an SD card 32, an MMC card 33, a memory stick 34, a CF card 35 or an embedded storage apparatus 36 (as shown in FIG. 3). The embedded storage device 36 includes an embedded MMC (eMMC). It may be noted that the eMMC is directly coupled to a substrate of the host system.

Figure 4:
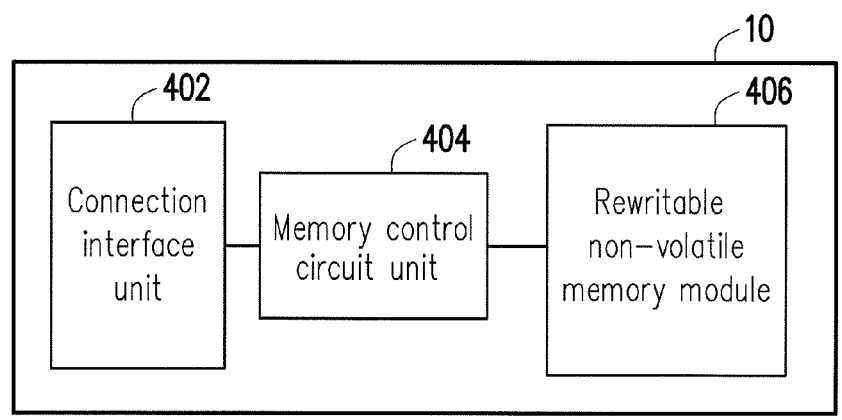
FIG. 4 is a schematic block diagram illustrating the memory storage device depicted in FIG. 1.

FIG. 4 is a schematic block diagram illustrating the memory storage device depicted in FIG. 1.

With reference to FIG. 4, the memory storage device 10 includes a connection interface unit 402, a memory control circuit unit 404 and a rewritable non-volatile memory module 406.

In the present exemplary embodiment, the connection interface unit 402 complies with the serial advanced technology attachment (SATA) standard. However, it should be understood that the present disclosure is not limited thereto, and the connection interface unit 402 may also comply with the parallel advanced technology attachment (PATA) standard, the Institute of Electrical and Electronic Engineers (IEEE) 1394 standard, the peripheral component interconnect (PCI) express standard, the universal serial bus (USB) standard, the secure digital (SD) standard, the ultra high speed-I (UHS-I) interface standard, the ultra high speed-II (UHS-II) interface standard, the memory stick (MS) interface standard, the multi media card (MMC) interface standard, the eMMC interface standard, the universal flash storage (UFS) interface standard, the compact flash (CF) standard, the integrated device electronics (IDE) standard, or other suitable standards. The connection interface unit 402 may be packaged with the memory control circuit unit 404 in a chip or disposed outside of a chip including the memory control circuit unit 404.

The memory control circuit unit 404 is configured to execute a plurality of logic gates or control instructions which are implemented in a hardware form or in a firmware form and perform the operations such as data writing, reading or erasing in the rewritable non-volatile memory module 406 according to the instruction of the host system 11.

The rewritable non-volatile memory module 406 is coupled to the memory control circuit unit 404 and configured to store the data written by the host system 11. The rewritable non-volatile memory module 406 may be a single level cell (SLC) NAND flash memory module (i.e., a memory cell in the rewritable non-volatile memory module 406 can store data of 1 bit), a multi level cell (MLC) NAND flash memory module (i.e., a memory cell in the rewritable non-volatile memory module 406 can store data of 2 bits), a trinary level cell (TLC) NAND flash memory module (i.e., a memory cell in the rewritable non-volatile memory module 406 can store data of 3 bits), other flash memory module or other memory module having the same characteristic.

Figure 5:
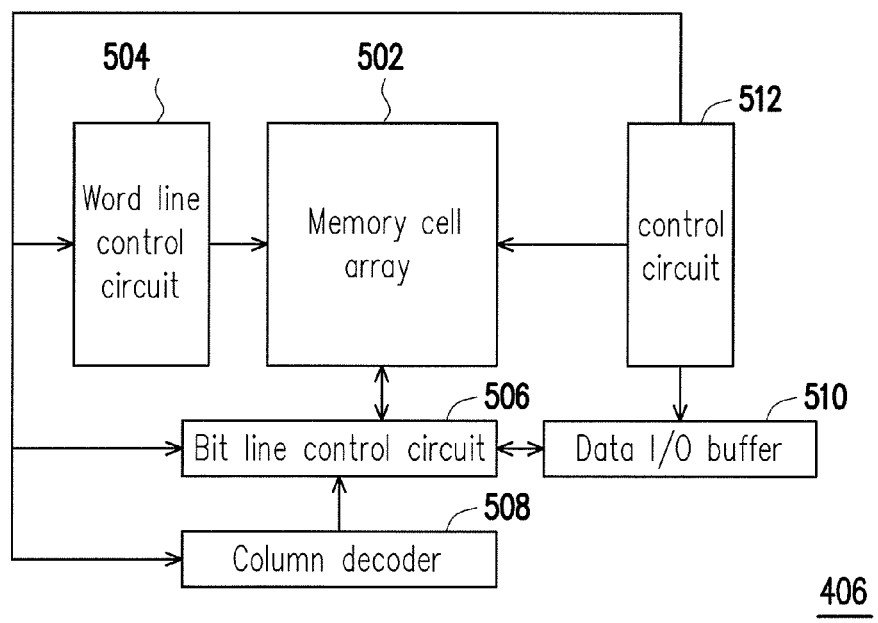
FIG. 5 is a schematic block diagram illustrating the rewritable non-volatile memory module according to an exemplary embodiment.
Figure 6:
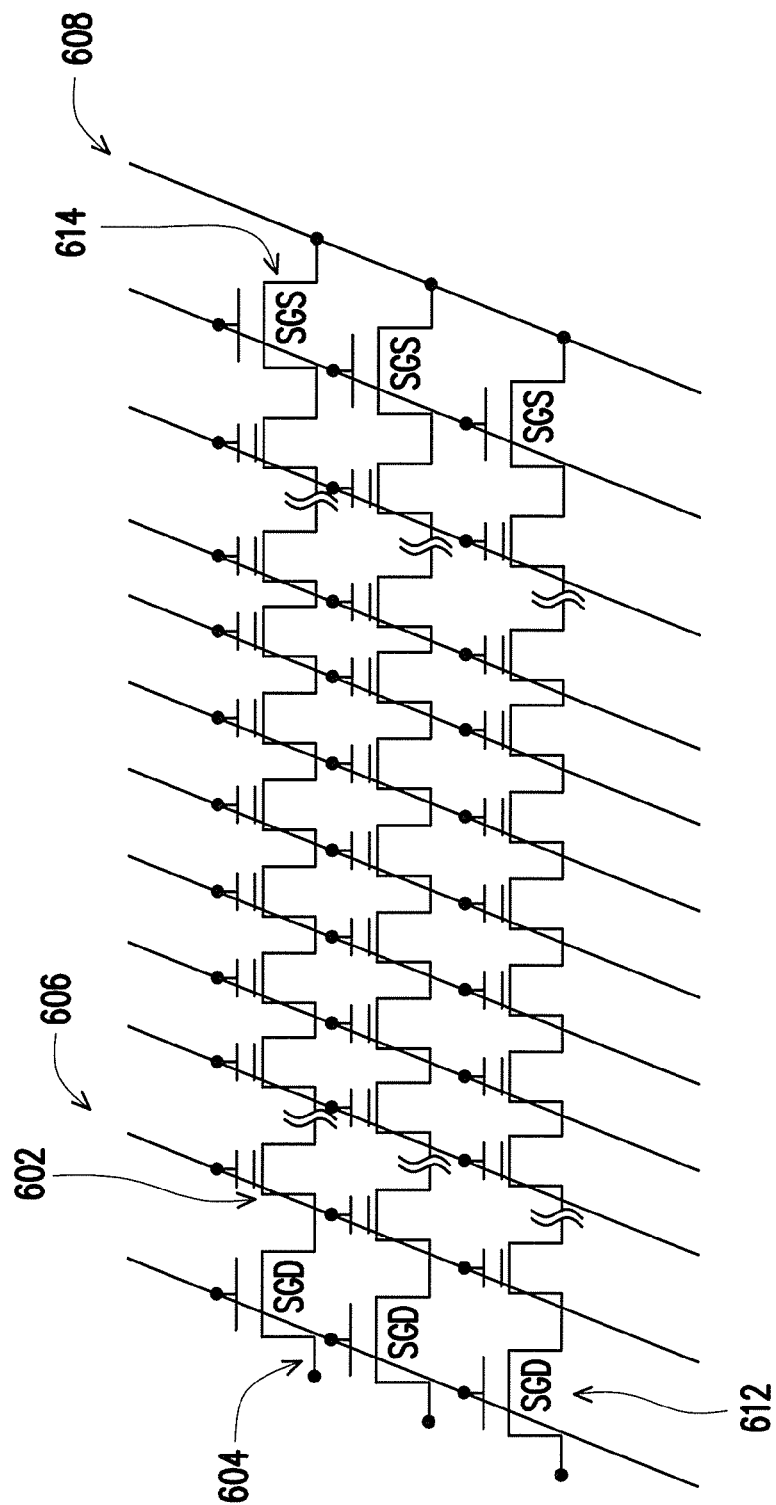
FIG. 6 is a schematic diagram illustrating a memory cell array according to an exemplary embodiment.

FIG. 5 is a schematic block diagram illustrating the rewritable non-volatile memory module according to an exemplary embodiment. FIG. 6 is a schematic diagram illustrating a memory cell array according to an exemplary embodiment.

With reference to FIG. 5, the rewritable non-volatile memory module 406 includes a memory cell array 502, a word line control circuit 504, a bit line control circuit 506, a column decoder 508, a data input/output (I/O) buffer 510 and a control circuit 512.

In the present exemplary embodiment, the memory cell array 502 includes a plurality of memory cells 602 for storing data, a plurality of select gate drain (SGD) transistors 612, a plurality of select gate source (SGS) transistors 614, a plurality of bit lines 604 connected with the memory cells, a plurality of word lines 606, and a common source line 608 (as shown in FIG. 6). The memory cells 602 are disposed on the cross points of the bit lines 604 and the word lines 606 in an array (or in a three-dimensional stacking manner). When receiving a write instruction or a read instruction from the memory control circuit unit 404, the control circuit 512 controls the word line control circuit 504, the bit line control circuit 506, the column decoder 508 and the data I/O buffer 510 to write data into or read data from the memory cell array 502, wherein the word line control circuit 504 is configured to control the voltage applied to the word lines 606, the bit line control circuit 506 is configured to control the voltage applied to the bit lines 604, the column decoder 508 selects the corresponding bit line according to the decoding column address in the instruction, and the data I/O buffer 510 is configured to store the data temporarily.

Each memory cell in the rewritable non-volatile memory module 406 stores one or more bits by changing a threshold voltage. To be specific, a charge trapping layer is provided between a control gate and a channel in each of the memory cells. An amount of electrons in the charge trapping layer may be changed by applying a write voltage to the control gate, such that the threshold voltage of the memory cell may be changed. This process of changing the threshold voltage is also referred to as "writing data into the memory cell" or "programming the memory cell". Along with the change of the threshold voltage, each memory cell in the memory cell array 502 has a plurality of storage states. Meanwhile, which state a memory cell belongs to may be determined through a read voltage, and thereby, one or more bits stored in the memory cell may be obtained.

Figure 7:
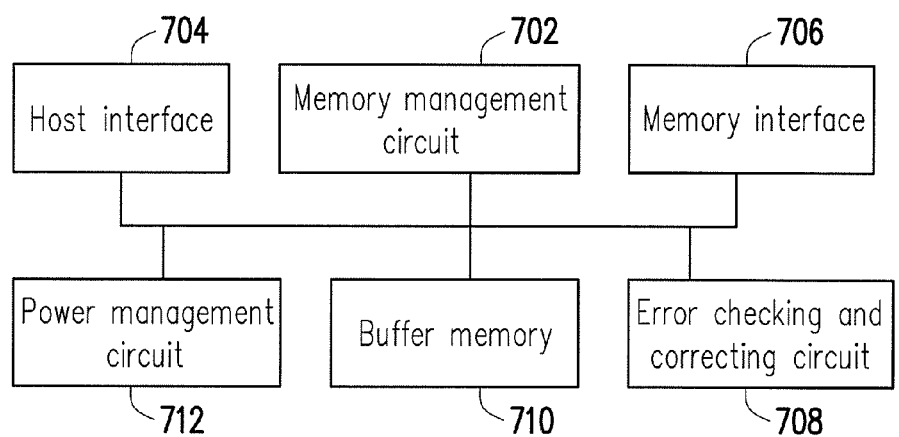
FIG. 7 is a schematic block diagram illustrating the memory control circuit unit according to an exemplary embodiment.

FIG. 7 is a schematic block diagram illustrating the memory control circuit unit according to an exemplary embodiment.

With reference to FIG. 7, the memory control circuit unit 404 includes a memory management circuit 702, a host interface 704, a memory interface 706 and an error checking and correcting circuit 708.

The memory management circuit 702 is configured to control overall operations of the memory control circuit unit 404. Specifically, the memory management circuit 702 has a plurality of control instructions. During operations of the memory storage device 10, the control instructions are executed to execute various operations such as writing, reading and erasing data. In the description set forth below, operations of the memory management circuit 702 are equivalent to the operations of the memory control circuit unit 404.

In the present exemplary embodiment, the control instructions of the memory management circuit 702 are implemented in a firmware form. For instance, the memory management circuit 702 has a microprocessor unit (not shown) and a read-only memory (ROM, not shown), and the control instructions are burned into the ROM. When the memory storage device 10 is in operation, the control instructions are executed by the microprocessor to execute operations, such as data writing, data reading or data erasing.

In another exemplary embodiment, the control instructions of the memory management circuit 702 may also be stored as program codes in a specific area (e.g., a system area in a memory exclusively used for storing system data) of the rewritable non-volatile memory module 406. In addition, the memory management circuit 702 has the microprocessor unit (not shown), the ROM (not shown) and a RAM (not shown). Particularly, the ROM has a boot code, and when the memory control circuit unit 404 is enabled, the boot code is executed by the microprocessor unit executes to load the control instructions stored in the rewritable non-volatile memory module 406 to the RAM of the memory management circuit 702. Thereafter, the control instructions are executed by the microprocessor unit to execute operations of data writing, data reading or data erasing.

Additionally, in another exemplary embodiment, the control instructions of the memory management circuit 702 may also be implemented in a hardware form. For example, the memory management circuit 702 includes a microcontroller, a physical unit management circuit, a memory writing circuit, a memory reading circuit, a memory erasing circuit and a data processing circuit. The physical unit management circuit, the memory writing circuit, the memory reading circuit, the memory erasing circuit and the data processing circuit are coupled to the microcontroller. The physical unit management circuit is configured to manage physical erasing units of the rewritable non-volatile memory module 406; the memory writing circuit is configured to issue a write instruction sequence to the rewritable non-volatile memory module 406 to write data to the rewritable non-volatile memory module 406; the memory reading circuit is configured to issue a read instruction sequence to the rewritable non-volatile memory module 406 to read data from the rewritable non-volatile memory module 406; the memory erasing circuit is configured to issue an erase instruction sequence to the rewritable non-volatile memory module 406 to erase data from the rewritable non-volatile memory module 4061 and the data processing circuit is configured to process data to be written to the rewritable non-volatile memory module 406 and data to be read from the rewritable non-volatile memory module 406. The write instruction sequence, read instruction sequence and the erase instruction sequence may respectively include one or more program codes or instruction codes and configured to instruct the rewritable non-volatile memory module 406 to perform the corresponding writing, reading and erasing operations.

The host interface 704 is coupled to the memory management circuit 702 and configured to receive and identify instructions and data sent from the host system 11. In other words, the instructions and data sent from the host system 11 are transmitted to the memory management circuit 702 through the host interface 704. In the present exemplary embodiment, the host interface 704 complies with the SATA standard. However, it should be understood that the present disclosure is not limited thereto, and the host interface 704 may also comply with the PATA standard, the IEEE 1394 standard, the PCI Express standard, the USB standard, the SD standard, the UHS-I standard, the UHS-II standard, the MS standard, the MMC standard, the eMMC standard, the UFS standard, the CF standard, the IDE standard or other suitable standards for data transmission.

The memory interface 706 is coupled to the memory management circuit 702 and configured to access the rewritable non-volatile memory module 406. That is, the data to be written to the rewritable non-volatile memory module 406 is converted to a format acceptable to the rewritable non-volatile memory module 406 through the memory interface 706. Specifically, if the memory management circuit 702 intends to access the rewritable non-volatile memory module 406, the memory interface 706 transmits corresponding instruction sequences. These instruction sequences may include one or more signal or data on the bus. For example, a read instruction sequence may contain information, such as a read identification code or a memory address.

The error checking and correcting circuit 708 is coupled to the memory management circuit 702 and configured to execute an error checking and correcting process to ensure the correctness of data. Specifically, when the memory management circuit 702 receives the write instruction from the host system 11, the error checking and correcting circuit 708 generates an error correcting code (ECC) and/or an error detecting code (EDC) for data corresponding to the write instruction, and the memory management circuit 702 writes the data and the ECC and/or the EDC corresponding to the write instruction to the rewritable non-volatile memory module 406. Subsequently, when the memory management circuit 702 reads the data from the rewritable non-volatile memory module 406, the corresponding ECC and/or the EDC is also read, and the error checking and correcting circuit 708 executes the error checking and correcting procedure on the read data based on the ECC and/or the EDC.

In an exemplary embodiment, the memory control circuit unit 404 also includes a buffer memory 710 and a power management circuit 712. The buffer memory 710 is coupled to the memory management circuit 702 and configured to temporarily store the data and the instruction from the host system 11 or the data from the rewritable non-volatile memory module 406. The power management circuit 712 is coupled to the memory management circuit 702 and configured to control the power of the memory storage device 10.

Figure 8:
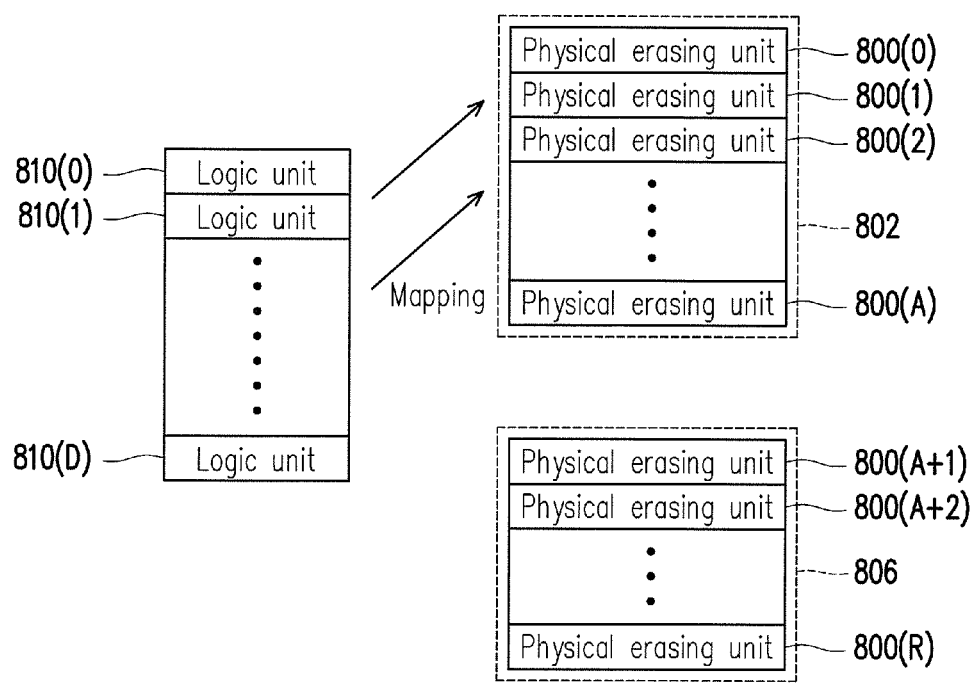
FIG. 8 is a schematic diagram of managing the rewritable non-volatile memory module according to an exemplary embodiment.

FIG. 8 is a schematic diagram of managing the rewritable non-volatile memory module according to an exemplary embodiment. It should be understood that terms, such as "select", "group", "divide", "associate" and so forth, are logical concepts which describe operations in the physical erasing units of the rewritable non-volatile memory module 406. That is, the physical erasing units of the rewritable non-volatile memory module are logically operated, but actual positions of the physical erasing units are not changed.

The memory cells of the rewritable non-volatile memory module 406 constitute a plurality of physical programming units, and the physical programming units constitute a plurality of physical erasing units. Specifically, the memory cells on the same word line constitute one or more physical programming units. If each of the memory cells can store more than two bits, the physical programming units on the same word line can be at least classified into a lower physical programming unit and an upper physical programming unit. For instance, a least significant bit (LSB) of one memory cell belongs to the lower physical programming unit, and a most significant bit (MSB) of one memory cell belongs to the upper physical programming unit. Generally, in the MLC NAND flash memory, a writing speed of the lower physical programming unit is faster than a writing speed of the upper physical programming unit, and/or a reliability of the lower physical programming unit is higher than a reliability of the upper physical programming unit. In the present exemplary embodiment, a physical programming unit is the smallest unit for programming. That is, a physical programming unit is the smallest unit for writing data. For example, a physical programming units may be a physical page or a physical sector. When the physical programming unit is the physical page, each physical programming unit usually includes a data bit area and a redundancy bit area. The data bit area includes multiple physical sectors configured to store user data, and the redundant bit area is configured to store system data (e.g., an error correcting code). In the present exemplary embodiment, the data bit area contains 32 physical sectors, and a size of each physical sector is 512 bytes (B). However, in other exemplary embodiments, the data bit area may also include 8, 16, or more or less physical sectors, and the present disclosure is not intent to limit the sizes and the number of the physical sectors. On the other hand, a physical erasing units is the smallest unit for erasing. Namely, each physical erasing unit contains the least number of memory cells to be erased together. For instance, a physical erasing unit may be a physical block.

With reference to FIG. 8, the memory management circuit 702 may logically divide physical erasing units 800(0) to 800(R) of the rewritable non-volatile memory module 406 into a plurality of areas such as a storage area 802 and a system area 806.

The physical erasing units in the storage area 802 are configured to store the data from the host system 11. The storage area 802 stores valid data and invalid data. For example, when the host system 11 intends to delete one valid data, the data being deleted may still be stored in the storage area 802 but marked as the invalid data. The physical erasing unit which does not store the valid data is also referred to as a spare physical erasing unit. The physical erasing unit being erased may become the spare physical erasing unit. Additionally, the physical erasing unit which does not store the valid data is also referred to as a non-spare physical erasing unit.

The physical erasing units in the system area 806 are configured to record system data including information related to manufacturer and model of a memory chip, a number of physical erasing units in the memory chip, a number of the physical programming unit in each physical erasing unit, and so forth. Moreover, the numbers of the physical erasing units in the storage area 802 and in the system area 806 vary with different memory standards.

The memory management circuit 702 may configure a plurality of logic units 810(0) to 810(D) for mapping the physical erasing units 800(0) to 800(A) in the storage area 802. For instance, in the present exemplary embodiment, the host system 11 accesses data from the storage area 802 through logic addresses. Therefore, each of the logic units 810(0) to 810(D) refers to a logic address. Additionally, in an exemplary embodiment, each of the logic units 810(0) to 810(D) may also be a logical sector, a logical programming unit, a logical erasing unit or composed of a plurality of consecutive logical addresses. Each of the logic units 810(0) to 810(D) is mapped to one or more physical units. In the present exemplary embodiment, a physical unit is a physical erasing unit. However, in another exemplary embodiment, a physical unit may also be a physical address, a physical sector, a physical programming unit or composed of multiple consecutive physical addresses, which is not limited in the present disclosure. The memory management circuit 702 may record the mapping relation between the logic units and the physical units in at least one logical-to-physical mapping table. When the host system 11 intends to read data from or write data to the memory storage device 10, the memory management circuit 702 may perform data access to the memory storage device 10 according to the logical-to-physical mapping table.

In the present exemplary embodiment, the storage area 802 includes a plurality of available physical units and at least one replacement physical unit. The available physical unit is a physical unit currently available for storing the valid data and/or the invalid data. The replacement physical units are configured to replace the physical units in the storage area 802 or the system area 806 that are damaged. A physical unit that is damaged may also be referred to as a bad physical unit below. Generally, when the memory storage device 10 is manufactured, the available physical units meets a standard number, and the replacement physical units meets another standard number. During the operations of the memory storage device 10, the number of the available physical units and the number of the replacement physical units are dynamically changed. For instance, if a certain available physical unit in the storage area 802 is damaged, a replacement physical unit is selected from the storage area 802 to replace the bad physical unit. Namely, the replacement physical unit selected for replacing the bad physical unit becomes a new available physical unit. In addition, if a certain physical unit in the system area 806 is damaged, a replacement physical unit may also be selected from the storage area 802 to replace the bad physical unit and associated to the system area 806.

Generally, if the number of the replacement physical units in a certain memory storage device is insufficient, for example, the number of the replacement physical units is less than a default number, the memory storage device is declared as in a write protect state, and no more data can be written thereto. For instance, the default number may be "1". However, such setting may shorten a lifespan of the memory storage device. That is because the memory storage device no longer receives and processes the operation instructions other than the read instruction when being in the write protect state. For instance, when being in the write protect state, the memory storage device is incapable of executing the data writing operation and the formatting operation of the memory storage device.

In the present exemplary embodiment, if the number of the replacement physical units in the storage area 802 is insufficient, at least one available physical unit originally configured to store data in the storage area 802 may also be associated as a replacement physical units, so as to prolong the lifespan of the memory storage device. If a certain available physical unit in the storage area 802 is associated as a replacement physical unit, the physical erasing unit is not used for storing data, until the physical erasing unit is again used to replace a certain bad physical unit in the storage area 802 or the system area 806.

In the present exemplary embodiment, the memory management circuit 702 provides capacity information (which is referred to as first capacity information hereinafter) with respect to an available capacity (which is referred to as a first available capacity hereinafter) of the rewritable non-volatile memory module 406 to the host system 11. The available capacity of the rewritable non-volatile memory module 406 refers to a total capacity of a plurality of available physical units in the storage area 802. For example, each available physical unit has an available capacity, and the total capacity is a sum of the available capacities. In the present exemplary embodiment, an available physical unit refers to an available physical erasing unit, and thus, the available capacity of one available physical unit is equal to a capacity (e.g., 1024× 1024 kilobytes (KB)) of one physical erasing unit. In other exemplary embodiments, a physical unit may also be a physical address, a physical sector, a physical programming unit or composed of multiple consecutive physical addresses, thus, the available capacity of one available physical unit may also be equal to a capacity of a physical address, a physical sector, a physical programming unit or multiple consecutive physical addresses, which is not limited in the present disclosure. In addition, the available capacity of each available physical unit may be the same or different. For instance, in an exemplary embodiment, if multiple physical units in the storage area 802 have different sizes/capacities, available capacities of the available physical units in the storage area 802 may also be different. In the present exemplary embodiment, the available physical units used for calculating the sum of the available capacities include all of the available physical units in the storage area 802. In another exemplary embodiment, the available physical units used for calculating the sum of the available capacities merely include part of, rather than all of, the available physical units in the storage area 802.

The host system 11 may synchronously update the available capacity of the rewritable non-volatile memory module 406 according to the first capacity information. For example, if the first capacity information indicates that the available capacity of the rewritable non-volatile memory module 406 is "80G", the host system 11 records the information for performing subsequent data access management on the rewritable non-volatile memory module 406. For instance, if the size of the data currently stored in the rewritable non-volatile memory module 406 by the host system 11 reaches "80G", the host system 11 determines that the available capacity of the rewritable non-volatile memory module 406 is insufficient and stop storing other data in the rewritable non-volatile memory module 406.

During the operation process of the memory storage device 10, some available physical units in the storage area 802 may be damaged, which leads to the increase in the number of the bad physical units. If a bad physical unit appears, a replacement physical unit is used to replace the bad physical unit, which leads to the decrease in the number of the replacement physical units.

Figure 9:
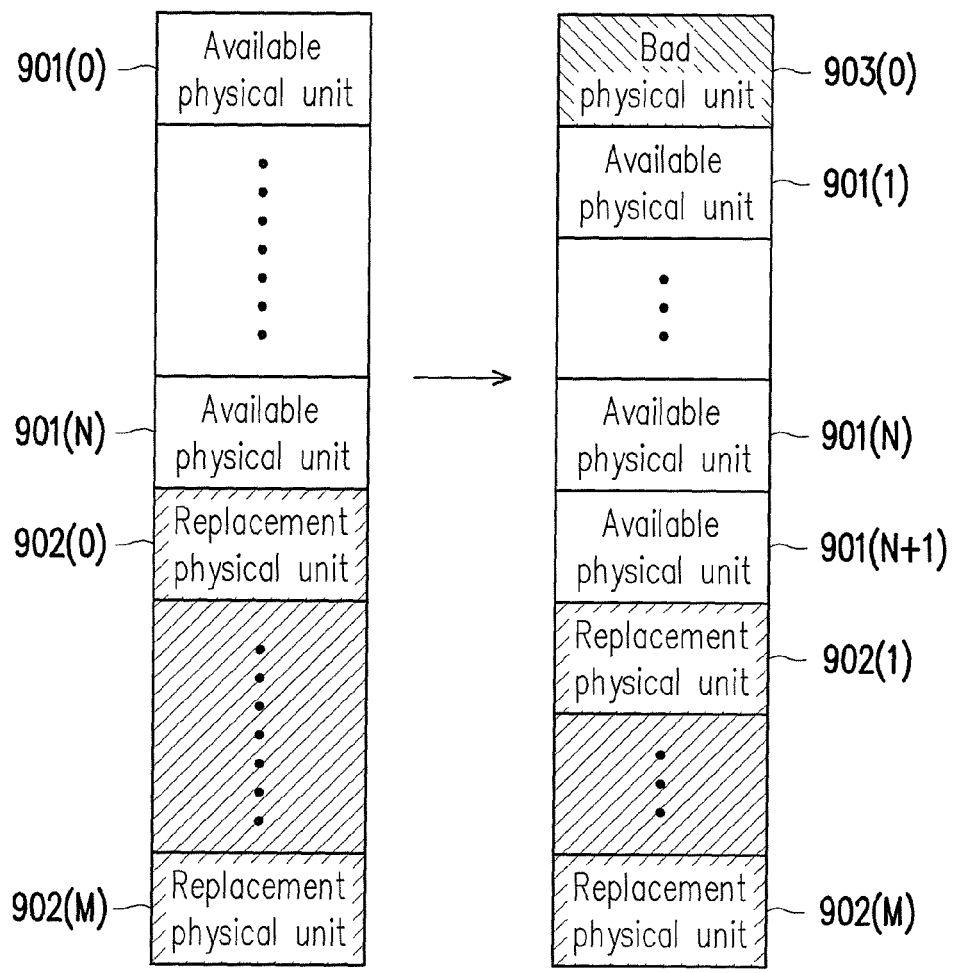
FIG. 9 is a schematic diagram of replacing a bad physical unit with a replacement physical unit according to an exemplary embodiment.

FIG. 9 is a schematic diagram of replacing a bad physical unit with a replacement physical unit according to an exemplary embodiment.

With reference to FIG. 9, it is assumed that the storage area 802 originally contains available physical units 901(0) to 901(N) and replacement physical units 902(0) to 902(M). If the available physical unit 901(0) is damaged, for example, the available physical unit 901(0) becomes a bad physical unit 903(0), the replacement physical unit 902(0) may be used to replace the bad physical unit 903(0) and become a new available physical unit 901(N+1). In the meantime, the number of the replacement physical units is deducted by "1", and the replacement physical units 902(1) to 902(M) remain. Through repeating the process of replacing a bad physical unit with one replacement physical unit, the number of the replacement physical units is continuously decreased. In the present exemplary embodiment, both N and M are integers, and M is less than N. However, in another exemplary embodiment, M may also be equal to or greater than N.

In the present exemplary embodiment, the memory management circuit 702 detects a replacement physical unit number of the rewritable non-volatile memory module 406. The replacement physical unit number is related to the number of the at least one replacement physical unit in the rewritable non-volatile memory module 406. The number of the at least one replacement physical unit refers to a current sum of the replacement physical units in the rewritable non-volatile memory module 406. The replacement physical unit number may be set according to the number of the at least one replacement physical unit in the rewritable non-volatile memory module 406. For instance, the replacement physical unit number may be the number itself of the at least one replacement physical unit in the rewritable non-volatile memory module 406. For instance, if the sum of the replacement physical units in the rewritable non-volatile memory module 406 is "5", the replacement physical unit number may be "5". Alternatively, the replacement physical unit number may also be obtained by executing a logic operation according to the number of the at least one replacement physical unit in the rewritable non-volatile memory module 406.

The memory management circuit 702 determines whether the replacement physical unit number meets a default condition. For instance, the memory management circuit 702 may determine whether the number of the at least one replacement physical unit in the rewritable non-volatile memory module 406 meets the default number according to the replacement physical unit number. If the number of the at least one replacement physical unit in the rewritable non-volatile memory module 406 meets the default number, the memory management circuit 702 determines that the replacement physical unit number meets the default condition. In the present exemplary embodiment, the default number is "0", for example. Namely, in the present exemplary embodiment, if the sum of all the replacement physical units in the rewritable non-volatile memory module 406 is "0", the memory management circuit 702 detects that the replacement physical unit number of the rewritable non-volatile memory module 406 meets the default condition. Otherwise, if the number of the at least one replacement physical unit in the rewritable non-volatile memory module 406 does not meet the default number, for example, the sum of all the replacement physical units in the rewritable non-volatile memory module 406 is greater than "0", the memory management circuit 702 determines that the replacement physical unit number of the rewritable non-volatile memory module 406 does not meet the default condition. However, in another exemplary embodiment, the default number may also be an arbitrary integer greater than "0", such as "1", "2", "3", "4" or a integer, which is not limited in the present disclosure.

In an exemplary embodiment, each available physical unit may be corresponding to (or mapped to) at least one of the logic units 810(0) to 810(D). The sum of the available capacities of the available physical units is equal to a total capacity of the currently configured logic units 810(0) to 810(D). If the sum of the available physical units is changed, the sum/total capacity of the logic units 810(0) to 810(D) is also correspondingly changed. For instance, if an available physical unit is associated as a replacement physical unit, one of the logic units 810(0) to 810(D) may be disregarded or ignored, so as to maintain the available capacity of the available physical unit in consistency with the total capacity of the currently configured logic units.

It is to be mentioned that in an exemplary embodiment, if the replacement physical unit number of the rewritable non-volatile memory module 406 is detected as meeting the default condition, the memory management circuit 702 does not declare the memory storage device 10 as in the write protect state. For instance, after the replacement physical unit number of the rewritable non-volatile memory module 406 is detected as meeting the default condition, the memory management circuit 702 still receives and processes various operation instructions from the host system 11. However, the memory management circuit 702 returns an operation failed message to the host system 11 in response to each of the received operation instructions other than the read instruction configured for reading the data from the rewritable non-volatile memory module 406.

The memory management circuit 702 adjusts the available capacity of the rewritable non-volatile memory module 406 from the first available capacity to another available capacity (which is also referred to as a second available capacity) according to the replacement physical unit number of the rewritable non-volatile memory module 406 meeting the default condition. In the present exemplary embodiment, the second available capacity is less than the first available capacity.

Figure 10:
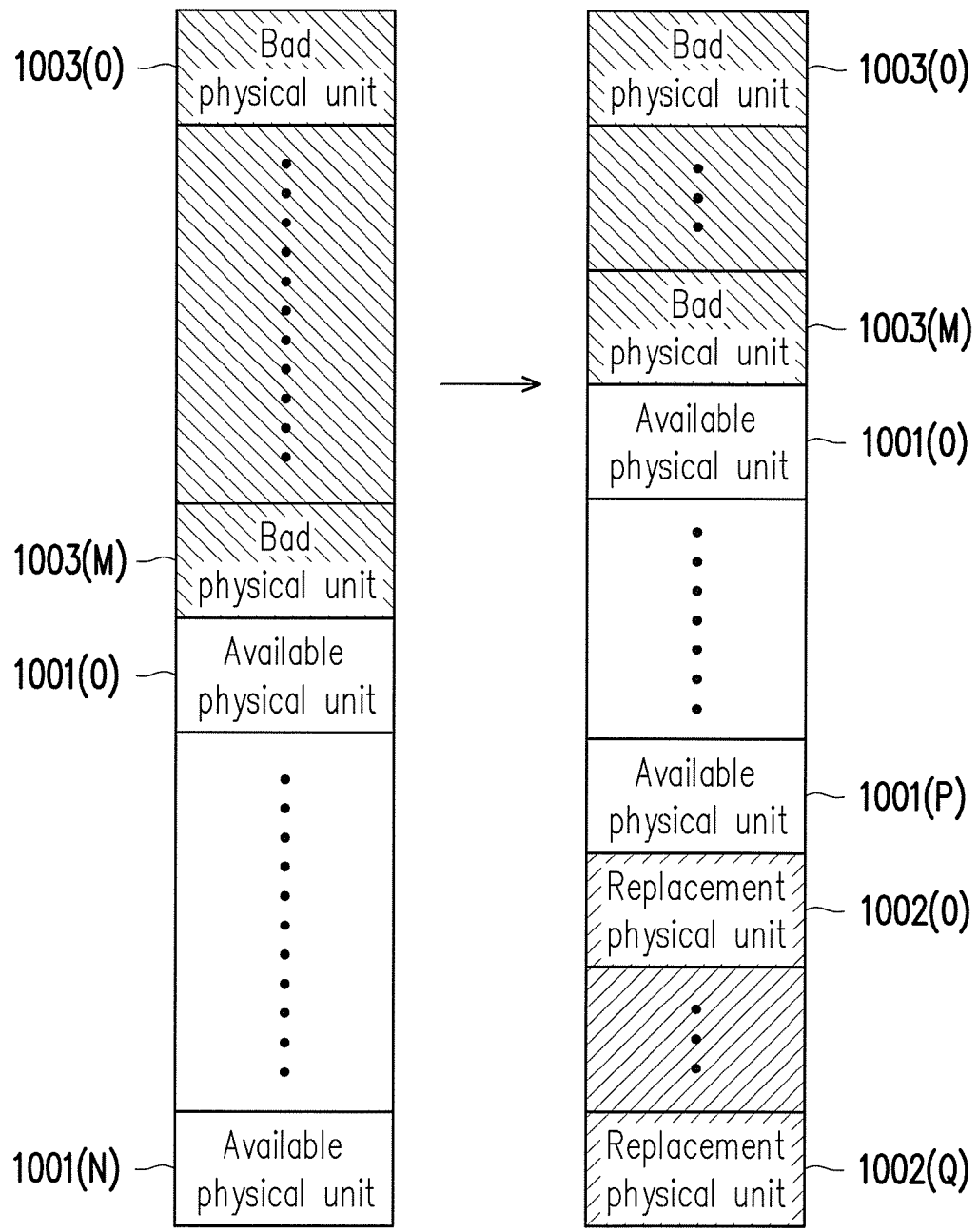
FIG. 10 is a schematic diagram of adjusting the available capacity of the rewritable non-volatile memory module according to an exemplary embodiment.

FIG. 10 is a schematic diagram of adjusting the available capacity of the rewritable non-volatile memory module according to an exemplary embodiment.

With reference to FIG. 10, it is assumed that all the replacement physical units in the storage area 802 are used to replace the bad physical units 1003(0) to 1003(M), and the available physical units 1001(0) to 1001(N) remains in the storage area 802 for storing data. The memory management circuit 702 selects at least one available physical unit from the available physical units 1001(0) to 1001(N) and associates the selected available physical units as new replacement physical units 1002(0) to 1002(Q). In this case, the storage area 802 contains the bad physical units 1003(0) to 1003(M), the available physical unit 1001(0) to 1001(P) and the replacement physical units 1002(0) to 1002(Q). P is a positive integer less than N. A sum of the number of the available physical units 1001(0) to 1001(P) and the number of the replacement physical units 1002(0) to 1002(Q) is equal to the number of the available physical units 1001(0) to 1001(N). In an exemplary embodiment, the number of the replacement physical units 1002(0) to 1002(Q) is equal to the number of the bad physical units 1003(0) to 1003(M). However, in another exemplary embodiment, the number of the replacement physical units 1002(0) to 1002(Q) may be greater than or less than the number of the bad physical units 1003(0) to 1003(M), which is not limited in the present disclosure. After the new replacement physical units 1002(0) to 1002(Q) are generated, the rewritable non-volatile memory module 406 may continue to be used for, for example, the data writing, the data erasing and the data reading operations. In addition, the number of the available physical units 1001(0) to 1001(P) is less than the number of the available physical units 1001(0) to 1001(N).

In the above exemplary embodiment, a sum of the available capacities of the available physical units 901(0) to 901(N) (or the sum of the available physical units 1001(0) to 1001(N)) may be considered as the first available capacity, and the sum of the available capacities of the available physical units 1001(0) to 1001(P) may be considered as the second available capacity. Thus, the second available capacity is less than the first available capacity. However, in another exemplary embodiment, if the number of the replacement physical units is too many (e.g., the number of the replacement physical units is over than a threshold), part of the replacement physical units may be served as the available physical units. In other words, in this case, the second available capacity is greater than the first available capacity.

It is to be mentioned that in the exemplary embodiments illustrated in FIG. 9 and FIG. 10, multiple physical erasing units of the same type are consecutively arranged for the convenience of description. In another exemplary embodiment, multiple physical erasing units of different types may also be alternately arranged.

After the available capacity of the rewritable non-volatile memory module 406 is adjusted from the first available capacity to the second available capacity, the memory management circuit 702 may provide capacity information (which is also referred to as second capacity information hereinafter) with respect to the second available capacity to the host system 11. Thereby, the host system 11 may synchronously update the available capacity of the rewritable non-volatile memory module 406 according to the second capacity information. For instance, if the second capacity information indicates that the available capacity of the rewritable non-volatile memory module 406 is "75G", the host system 11 records the information for performing subsequent data access management on the rewritable non-volatile memory module 406.

In an exemplary embodiment, the memory management circuit 702 may perform the operation of adjusting the available capacity of the rewritable non-volatile memory module 406 at any time point after the replacement physical unit number of the rewritable non-volatile memory module 406 is detected as meeting the default condition. However, in another exemplary embodiment, after the replacement physical unit number of the rewritable non-volatile memory module 406 is detected as meeting the default condition, the memory management circuit 702 waits for a specific operation instruction (which is also referred to as a first operation instruction hereinafter). The memory management circuit 702 may perform the operation of adjusting the available capacity of the rewritable non-volatile memory module 406 after receiving the first operation instruction. Thereby, a risk that the data which a user still needs being accidentally deleted during the process of adjusting the available capacity may be reduced.

In an exemplary embodiment, the memory management circuit 702 receives the first operation instruction from the host system 11. For example, the first operation instruction may be a formatting operation instruction. In addition, the first operation instruction may also be an arbitrary preset operation instruction, which is not limited in the present disclosure. The memory management circuit 702 performs the operation of adjusting the available capacity of the rewritable non-volatile memory module 406 according to the first operation instruction. The memory management circuit 702 may also return an operation failed message corresponding to the first operation instruction according to the first operation instruction. For instance, the memory management circuit 702 may return a programming operation failed message to inform the host system 11 that a failure occur to the programming operation to be performed thereby. Additionally, in an exemplary embodiment, the operation failed message may also be used to inform a message, such as a re-connection with (or a re-insertion to) the memory storage device 10.

In an exemplary embodiment, the memory management circuit 702 may provide the second capacity information to the host system 11 at any time point after the available capacity of the rewritable non-volatile memory module 406 is adjusted from the first available capacity to the second available capacity. For instance, the operation of providing the second capacity information to the host system 11 may be actively performed by the memory management circuit 702 or passively performed in response to a capacity query instruction from the host system 11. However, in another exemplary embodiment, after the available capacity of the rewritable non-volatile memory module 406 is adjusted from the first available capacity to the second available capacity, the memory management circuit 702 waits for the memory storage device 10 or the rewritable non-volatile memory module 406 being re-powered on (e.g., reboot, re-coupled to the host system 11 or re-inserted to the host system 11). The memory management circuit 702 may provide the second capacity information to the host system 11 after the memory storage device 10 or the rewritable non-volatile memory module 406 is re-powered on. For instance, the operation of providing the second capacity information to the host system 11 may be actively performed by the memory management circuit 702 or passively performed in response to the capacity query instruction from the host system 11 after the memory storage device 10 or the rewritable non-volatile memory module 406 is re-powered on. Additionally, in another exemplary embodiment, after the available capacity of the rewritable non-volatile memory module 406 is adjusted from the first available capacity to the second available capacity, the memory management circuit 702 may also perform a power-off and power-on simulation operation, to simulate an operation of the user pulling out and inserting the memory storage device 10. According to the power-off and power-on simulation operation, the host system 11 may identify that the memory storage device 10 of the rewritable non-volatile memory module 406 is re-powered on. After performing the power-off and power-on simulation operation, the memory management circuit 702 may actively or passively perform the operation of providing the second capacity information to the host system 11.

In an exemplary embodiment, after providing the second capacity information to the host system 11, the memory management circuit 702 waits for another specific operation instruction (which is also referred to as a second operation instruction hereinafter). For example, the second operation instruction may be a formatting operation instruction. For example, the second operation instruction may carry information with respect to the formatting of the rewritable non-volatile memory module 406, such as in which format the rewritable non-volatile memory module 406 is to be formatted and/or which formatting mode is to be used for the formatting. The memory management circuit 702 receives the second operation instruction. The memory management circuit 702 transmits a format operation instruction sequence to instruct to format the rewritable non-volatile memory module 406 according to the second operation instruction. The formatted rewritable non-volatile memory module 406 has the second available capacity. Taking the exemplary embodiment illustrated in FIG. 10 for example, the second available capacity refers to the sum of the available capacities of the available physical unit 1001(0) to 1001(P), and thus, the rewritable non-volatile memory module 406 erases the available physical units 1001(0) to 1001(P) according to the format operation instruction sequence. After the rewritable non-volatile memory module 406 is formatted, the memory storage device 10 may then continue to be used normally. Taking the exemplary embodiment illustrated in FIG. 10 for example, in subsequent usage process of the memory storage device 10, the replacement physical units 1002(0) to 1002(Q) may be used to replace the damaged available physical units appearing in the available physical units 1001(0) to 1001(P).

In an exemplary embodiment, the operation of adjusting the available capacity of the rewritable non-volatile memory module 406 may be repeatedly performed to continuously prolong the lifespan of the memory storage device 10. In another exemplary embodiment, a threshold of adjustment times and/or a lower capacity limit may be set. If the times of the performed operation of adjusting the available capacity of the rewritable non-volatile memory module 406 reaches the threshold of adjustment times, and/or the adjusted second available capacity is less than or equal to the lower capacity limit, a further capacity adjustment operation (i.e., the operation of adjusting the available capacity of the rewritable non-volatile memory module 406) is prohibited.

Figure 11:
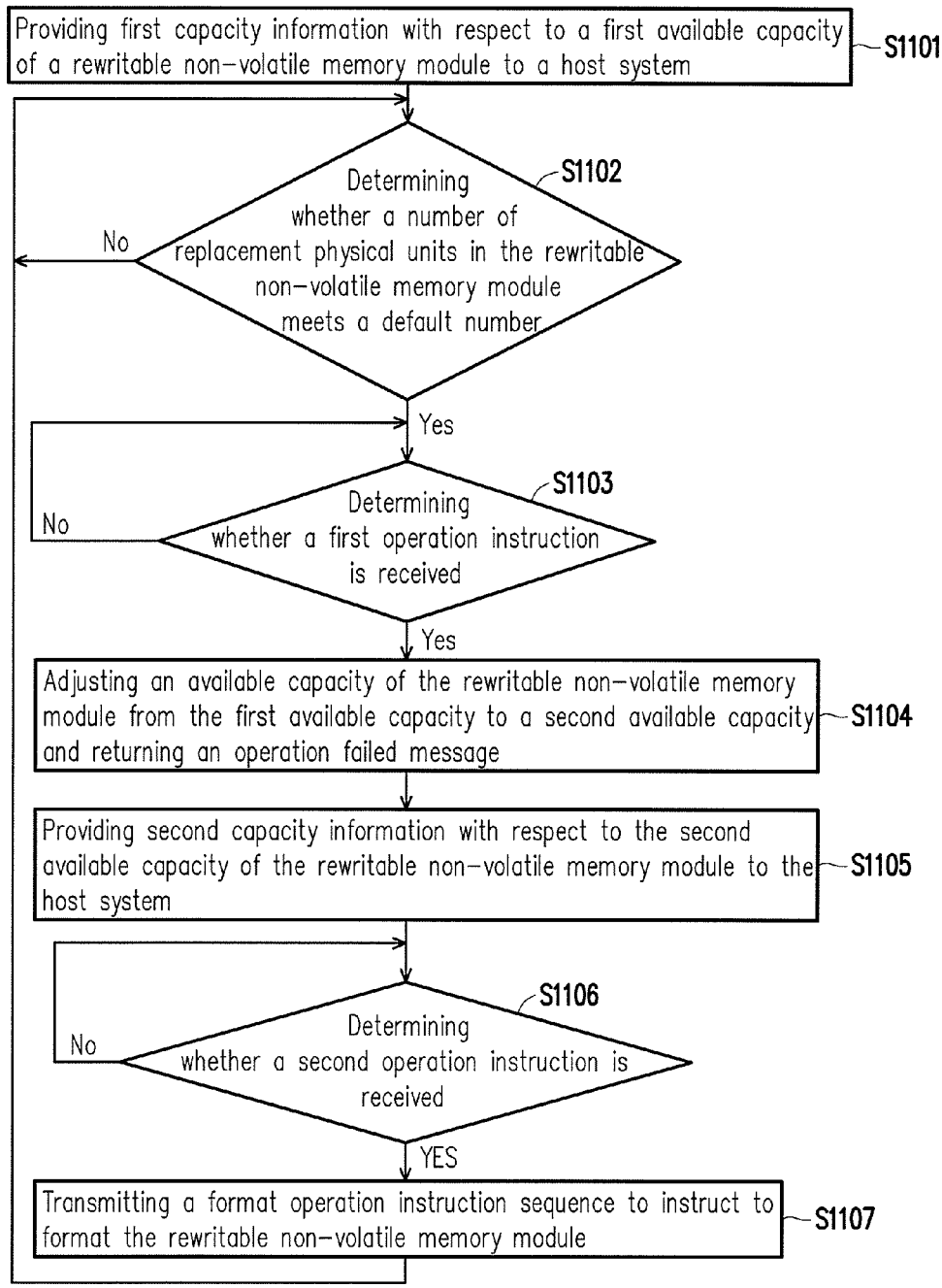
FIG. 11 is a flowchart illustrating a memory management method according to an exemplary embodiment.

FIG. 11 is a flowchart illustrating a memory management method according to an exemplary embodiment.

With reference to FIG. 11, in step S1101, first capacity information with respect to a first available capacity of a rewritable non-volatile memory module is provided to a host system. In step S1102, whether a number of replacement physical units in the rewritable non-volatile memory module meets a default number is determined. If the number of the replacement physical units in the rewritable non-volatile memory module does not meet the default number, step S1102 may be repeatedly performed. If the number of the replacement physical units in the rewritable non-volatile memory module meets the default number, in step S1103, whether a first operation instruction is received is determined. For example, the first operation instruction may be a formatting operation instruction. If the first operation instruction is not received, step S1103 may be repeatedly performed. If the first operation instruction is received, in step S1104, an available capacity of the rewritable non-volatile memory module is adjusted from the first available capacity to a second available capacity and an operation failed message corresponding to the first operation instruction is returned.

In step S1105, second capacity information with respect to the second available capacity of the rewritable non-volatile memory module is provided to the host system. It may be noted that in another exemplary embodiment, step S1105 is performed after the memory storage device or the rewritable non-volatile memory module is actually unplugged in and plugged in or is simulated being unplugged in and plugged in. For instance, if the memory storage device or the rewritable non-volatile memory module is not actually unplugged in and plugged in or is not simulated being unplugged in and plugged in, then step S1106 may not be performed.

In step S1106, whether a second operation instruction is received is determined. For example, the second operation instruction may be a formatting operation instruction. If the second operation instruction is not received, step S1106 may be repeatedly performed. If the second operation instruction is received, in step S1107, a format operation instruction sequence is transmitted to instruct to format the rewritable non-volatile memory module. After step S1107, step S1102 may be repeatedly performed.

However, each step in FIG. 11 has been described in detail above and thus, will not be repeated. It should be noted that the steps depicted in FIG. 11 may be implemented as a plurality of program codes or circuits, and the present disclosure is not limited thereto. In addition, the method illustrated in FIG. 11 can be used accompanying the foregoing exemplary embodiments, or can be used separately, and the present disclosure is not limited thereto.

To summarize, in the present disclosure, when the replacement physical unit number of the rewritable non-volatile memory module meeting a specific default condition is detected, the available capacity of the rewritable non-volatile memory module is adjusted. In addition, in the present disclosure, the adjusted available capacity may be synchronized to the host system through an adaptive manner. In this way, the host system can be ensued synchronously updating the capacity information of the memory storage device, while the lifespan of the memory storage device can be prolonged. The previously described exemplary embodiments of the present disclosure have the advantages aforementioned, wherein the advantages aforementioned not required in all versions of the present disclosure.

It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims and their equivalents.

What is claimed is:

1. A memory management method, for controlling a rewritable non-volatile memory module, the memory management method comprising:

detecting a replacement physical unit number of the rewritable non-volatile memory module, wherein the replacement physical unit number is related to a number of at least one replacement physical unit in the rewritable non-volatile memory module, wherein each of the at least one replacement physical unit is configured to replace a bad physical unit in the rewritable non-volatile memory module;

adjusting an available capacity of the rewritable non-volatile memory module from a first available capacity to a second available capacity if the replacement physical unit number of the rewritable non-volatile memory module meets a default condition;

providing second capacity information with respect to the second available capacity of the rewritable non-volatile memory module to a host system;

receiving a second operation instruction; and transmitting a format operation instruction sequence to instruct to format the rewritable non-volatile memory module according to the second operation instruction, wherein the formatted rewritable non-volatile memory module has the second available capacity, wherein the available capacity is a total capacity of a plurality of available physical units in the rewritable non-volatile memory module, wherein each of the available physical units does not belong to the at least one replacement physical unit.

2. The memory management method according to claim 1, wherein the second available capacity is less than the first available capacity.

3. The memory management method according to claim 1, further comprising:

providing first capacity information with respect to the first available capacity of the rewritable non-volatile memory module to the host system before the step of detecting that the replacement physical unit number of the rewritable non-volatile memory module meets the default condition.

4. The memory management method according to claim 3, further comprising:

not declaring the rewritable non-volatile memory module as in a write protect state if the replacement physical unit number of the rewritable non-volatile memory module meets the default condition.

5. The memory management method according to claim 1, further comprising:

re-powering on the rewritable non-volatile memory module or performing a power-off and power-on simulation operation before the step of providing the second capacity information with respect to the second available capacity of the rewritable non-volatile memory module to the host system.

6. The memory management method according to claim 1, further comprising:

determining whether the number of the at least one replacement physical unit in the rewritable non-volatile memory module meets a default number according to the replacement physical unit number; and if the number of the at least one replacement physical unit in the rewritable non-volatile memory module meets the default number, determining that the replacement physical unit number of the rewritable non-volatile memory module meets the default condition.

7. The memory management method according to claim 1, wherein the step of adjusting the available capacity of the rewritable non-volatile memory module from the first available capacity to the second available capacity comprises:

selecting at least one available physical unit from the available physical units of the rewritable non-volatile memory module; and associating the at least one selected available physical unit as the at least one replacement physical unit.

8. The memory management method according to claim 1, wherein the step of adjusting the available capacity of the rewritable non-volatile memory module from the first available capacity to the second available capacity comprises:

receiving a first operation instruction;

adjusting the available capacity of the rewritable non-volatile memory module from the first available capacity to the second available capacity according to the first operation instruction; and returning an operation failed message corresponding to the first operation instruction.

9. A memory storage device, comprising:

a connection interface unit configured to couple to a host system;

a rewritable non-volatile memory module; and a memory control circuit unit coupled to the connection interface unit and the rewritable non-volatile memory module, wherein the memory control circuit unit is configured to detect a replacement physical unit number of the rewritable non-volatile memory module, wherein the replacement physical unit number is related to a number of at least one replacement physical unit in the rewritable non-volatile memory module, wherein each of the at least one replacement physical unit is configured to replace a bad physical unit in the rewritable non-volatile memory module; and wherein the memory control circuit unit is further configured to adjust an available capacity of the rewritable non-volatile memory module from a first available capacity to a second available capacity if the replacement physical unit number of the rewritable non-volatile memory module meets a default condition, wherein the memory control circuit unit is further configured to provide second capacity information with respect to the second available capacity of the rewritable non-volatile memory module to the host system, wherein the memory control circuit unit is further configured to receive a second operation instruction, wherein the memory control circuit unit is further configured to transmit a format operation instruction sequence to instruct to format the rewritable non-volatile memory module according to the second operation instruction, wherein the formatted rewritable non-volatile memory module has the second available capacity, wherein the available capacity is a total capacity of a plurality of available physical units in the rewritable non-volatile memory module, wherein each of the available physical units does not belong to the at least one replacement physical unit.

10. The memory storage device according to claim 9, wherein the second available capacity is less than the first available capacity.

11. The memory storage device according to claim 9, wherein the memory control circuit unit is further configured to provide first capacity information with respect to the first available capacity of the rewritable non-volatile memory module to the host system before the operation of detecting that the replacement physical unit number of the rewritable non-volatile memory module meets the default condition.

12. The memory storage device according to claim 11, wherein the memory control circuit unit is further configured not to declare the rewritable non-volatile memory module as in a write protect state if the replacement physical unit number of the rewritable non-volatile memory module meets the default condition.

13. The memory storage device according to claim 9, wherein the memory control circuit unit is further configured to re-power on the rewritable non-volatile memory module or perform a power-off and power-on simulation operation before the operation of providing the second capacity information with respect to the second available capacity of the rewritable non-volatile memory module to the host system.

14. The memory storage device according to claim 9, wherein the memory control circuit unit is further configured to determine whether the number of the at least one replacement physical unit in the rewritable non-volatile memory module meets a default number according to the replacement physical unit number,
wherein the memory control circuit unit is further configured to determine that the replacement physical unit number of the rewritable non-volatile memory module meets the default condition if the number of the at least one replacement physical unit in the rewritable non-volatile memory module meets the default number.

15. The memory storage device according to claim 9, wherein the operation of the memory control circuit unit adjusting the available capacity of the rewritable non-volatile memory module from the first available capacity to the second available capacity comprises:
selecting at least one available physical unit from the available physical units of the rewritable non-volatile memory module; and
associating the at least one selected available physical unit as the at least one replacement physical unit.

16. The memory storage device according to claim 9, wherein the operation of the memory control circuit unit adjusting the available capacity of the rewritable non-volatile memory module from the first available capacity to the second available capacity comprises:
receiving a first operation instruction;
adjusting the available capacity of the rewritable non-volatile memory module from the first available capacity to the second available capacity according to the first operation instruction; and
returning an operation failed message corresponding to the first operation instruction.

17. A memory control circuit unit for controlling a rewritable non-volatile memory module, the memory control circuit unit comprising:
a host interface configured to couple to a host system;
a memory interface configured to couple to the rewritable non-volatile memory module; and
a memory management circuit coupled to the host interface and the memory interface,
wherein the memory management circuit is configured to detect a replacement physical unit number of the rewritable non-volatile memory module, wherein the replacement physical unit number is related to a number of at least one replacement physical unit in the rewritable non-volatile memory module, wherein each of the at least one replacement physical unit is configured to replace a bad physical unit in the rewritable non-volatile memory module; and
wherein the memory management circuit is further configured to adjust an available capacity of the rewritable non-volatile memory module from a first available capacity to a second available capacity if the replacement physical unit number of the rewritable non-volatile memory module meets a default condition,
wherein the memory management circuit is further configured to provide second capacity information with respect to the second available capacity of the rewritable non-volatile memory module to the host system,
wherein the memory management circuit is further configured to receive a second operation instruction,
wherein the memory management circuit is further configured to transmit a format operation instruction sequence to instruct to format the rewritable non-volatile memory module according to the second operation instruction,
wherein the formatted rewritable non-volatile memory module has the second available capacity,
wherein the available capacity is a total capacity of a plurality of available physical units in the rewritable non-volatile memory module, wherein each of the available physical units does not belong to the at least one replacement physical unit.

18. The memory control circuit unit according to claim 17, wherein the second available capacity is less than the first available capacity.

19. The memory control circuit unit according to claim 17, wherein the memory management circuit is further configured to provide first capacity information with respect to the first available capacity of the rewritable non-volatile memory module to the host system before the operation of detecting that the replacement physical unit number of the rewritable non-volatile memory module meets the default condition.

20. The memory control circuit unit according to claim 19, wherein the memory management circuit is further configured to not to declare the rewritable non-volatile memory module as in a write protect state if the replacement physical unit number of the rewritable non-volatile memory module meets the default condition.

21. The memory control circuit unit according to claim 17, wherein the memory management circuit is further configured to re-power on the rewritable non-volatile memory module or perform a power-off and power-on simulation operation before the operation of providing the second capacity information with respect to the second available capacity of the rewritable non-volatile memory module to the host system.

22. The memory control circuit unit according to claim 17, wherein the memory management circuit is further configured to determine whether the number of the at least one replacement physical unit in the rewritable non-volatile memory module meets a default number according to the replacement physical unit number,
wherein the memory management circuit is further configured to determine that the replacement physical unit number of the rewritable non-volatile memory module meets the default condition if the number of the at least one replacement physical unit in the rewritable non-volatile memory module meets the default number.

23. The memory control circuit unit according to claim 17, wherein the operation of the memory management circuit adjusting the available capacity of the rewritable non-volatile memory module from the first available capacity to the second available capacity comprises:
selecting at least one available physical unit from the available physical units of the rewritable non-volatile memory module; and
associating the at least one selected available physical unit as the at least one replacement physical unit.

24. The memory control circuit unit according to claim 17, wherein the operation of the memory management circuit adjusting the available capacity of the rewritable non-volatile memory module from the first available capacity to the second available capacity comprises:
receiving a first operation instruction;
adjusting the available capacity of the rewritable non-volatile memory module from the first available capacity to the second available capacity according to the first operation instruction; and returning an operation failed message corresponding to the first operation instruction.

\* \* \* \* \*